(12) United States Patent
Shelby et al.

(10) Patent No.: US 8,388,842 B2
(45) Date of Patent: Mar. 5, 2013

(54) BRINE SEAL FOR A FILTRATION DEVICE (75) Inventors: Irving Shelby, San Diego, CA (US);
Craig R. Bartels, San Diego, CA (US);
Dirk Dewinter, Vista, CA (US)

(73) Assignee: Hydranautics, Oceanside, CA (US)

( * ) Notice: Subject to any disclaimer, the term of this patent is extended or adjusted under 35 U.S.C. 154(b) by 206 days.

(21) Appl. No.: 13/008,612

(22) Filed: Jan. 18, 2011

(65) Prior Publication Data
US 2011/0174713 A1    Jul. 21, 2011

Related U.S. Application Data (60) Provisional application No. 61/295,388, filed on Jan. 15, 2010.

(51) Int. Cl.
*B01D 63/06* (2006.01)
*B01D 65/00* (2006.01)
*B01D 35/30* (2006.01)

(52) U.S. Cl. ............. 210/321.78; 210/232; 210/321.83; 210/321.87; 210/437; 210/497.1; 210/541

(58) Field of Classification Search .................. 210/232, 210/236, 321.74, 321.6, 321.78, 321, 83, 210/87, 437, 497.01, 497.1, 541
See application file for complete search history.

(56) References Cited

U.S. PATENT DOCUMENTS

| | | |
|---|---|---|
| 3,097,855 A | 7/1963 | Allen |
| 3,235,274 A | 2/1966 | Cain, Jr. et al. |
| 4,102,608 A | 7/1978 | Balkau et al. |
| 4,204,690 A | 5/1980 | Holland et al. |
| 4,906,372 A | 3/1990 | Hopkins |
| 4,911,840 A | 3/1990 | Underwood |
| 5,389,260 A | 2/1995 | Hemp et al. |
| 5,470,469 A | 11/1995 | Eckman |
| 5,554,283 A | 9/1996 | Brinda et al. |
| 5,762,788 A | 6/1998 | Gullett |
| 5,851,267 A | 12/1998 | Schwartz |
| 5,891,334 A | 4/1999 | Gundrum et al. |
| 5,992,518 A | 11/1999 | Whitlock |
| 6,224,767 B1 | 5/2001 | Fujiwara et al. |
| 6,235,194 B1 | 5/2001 | Jousset |

(Continued)

FOREIGN PATENT DOCUMENTS

| | | |
|---|---|---|
| EP | 0141201 A1 | 5/1985 |
| EP | 0188224 A2 | 7/1986 |

(Continued)

OTHER PUBLICATIONS

Written Opinion issued Jan. 17, 2012 in Int'l Application No. PCT/US2011/021552.

(Continued)

*Primary Examiner* — John Kim
(74) *Attorney, Agent, or Firm* — Panitch Schwarze Belisario & Nadel LLP (57) ABSTRACT

A filtration device having a tubular pressure vessel and a tubular filter assembly is provided. The tubular filter assembly is housed within the tubular pressure vessel and includes a filter element and a split ring seal circumscribing the filter element. The split ring seal has an annular body that includes a first end, a second end opposite the first end and slidably engaged with the first end, and an opening extending through the annular body.

14 Claims, 6 Drawing Sheets

U.S. PATENT DOCUMENTS

| | | |
|---|---|---|
| 6,500,335 B2 | 12/2002 | Janik et al. |
| 6,615,990 B1 | 9/2003 | Jokschas et al. |
| 6,632,356 B2 | 10/2003 | Hallan et al. |
| 6,656,362 B1 | 12/2003 | Kihara et al. |
| 6,692,639 B1 | 2/2004 | Spearman et al. |
| 6,830,683 B2 | 12/2004 | Gundrum et al. |
| 7,063,789 B2 | 6/2006 | Colby et al. |
| 7,147,110 B2 | 12/2006 | Clausen et al. |
| 7,168,573 B2 | 1/2007 | Brown et al. |
| 7,198,719 B2 | 4/2007 | Chikura et al. |
| 7,267,330 B1 | 9/2007 | Fleming et al. |
| 7,387,731 B2 | 6/2008 | Colby et al. |
| 7,396,463 B2 | 7/2008 | Moller |
| 7,628,280 B2 | 12/2009 | Mandt et al. |
| 7,682,507 B2 | 3/2010 | Stamey, Jr. et al. |
| 7,771,595 B2 | 8/2010 | Reynolds et al. |
| 2003/0024868 A1 | 2/2003 | Hallan et al. |
| 2009/0314713 A1 | 12/2009 | Shelby et al. |
| 2011/0084013 A1 | 4/2011 | Lesan et al. |
| 2011/0084455 A1 | 4/2011 | Elwell et al. |

FOREIGN PATENT DOCUMENTS

| | | |
|---|---|---|
| JP | 2009189947 A | 8/2009 |
| NL | 1031276 C1 | 9/2007 |
| WO | 03101594 A1 | 12/2003 |

OTHER PUBLICATIONS

Int'l Search Report Issued Apr. 26, 2011 in Int'l Application No. PCT/US2011/021552; Written Opinion.

DMR Quad-Ring Seals brochure, Print-out from website www.dmr-usa.com, date unknown.

'Toray', TORAYSEAL brochure, Print-out from website www.toraywater.com, date unknown.

'Toray', TORAYAxial brochure, Print-out from website www.toraywater.com, date unknown.

Int'l Preliminary Examination Report issued May 21, 2012 in Int'l Application No. PCT/US2011/021552.

*Fig. 7* ning of feed liquid.  That is, when the tubular filter assembly is moved in the feed flow direction, the U-cup brine seal naturally folds on itself. However, if the tubular filter assembly 1002 is pulled in the opposite direction, the U-cup brine seal will open up and create much more friction and resistance to movement in the direction opposite to the feed flow direction. Because of this issue, many plants load pressure vessels from the feed-side and remove the tubular filter assemblies from the brine-side of the tubular pressure vessel. This, however, results in a greater need for plant floor space to accommodate this type of action about both ends of the tubular pressure vessel.
BRINE SEAL FOR A FILTRATION DEVICE

CROSS-REFERENCE TO RELATED APPLICATIONS

The present application claims the benefit of U.S. Provisional Patent Application No. 61/295,388, filed Jan. 15, 2010 and entitled "Two-way Seal For Spiral Wound Element," the disclosure of which is hereby incorporated by reference in its entirety.

BACKGROUND OF THE INVENTION

The present invention generally relates to water filtration apparatuses. In particular, the present invention relates to a cross-flow water filtration apparatus that includes a brine seal having a bypass. Filters to which the present invention is applicable include reverse osmosis, ultrafiltration, nanofiltration and microfiltration filters.

Figure 1:
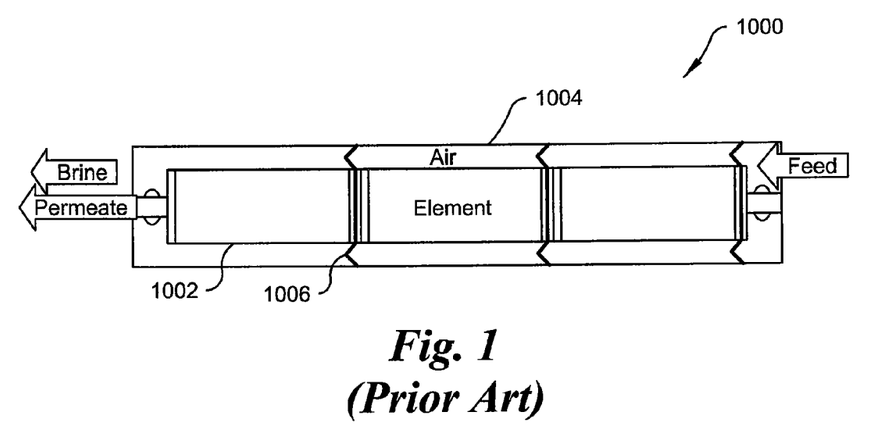
FIG. 1 is a schematic representation showing a partial, cross-sectional, side elevational view of a conventional filter apparatus having multiple filter assemblies installed within a pressure vessel.
Figure 2:
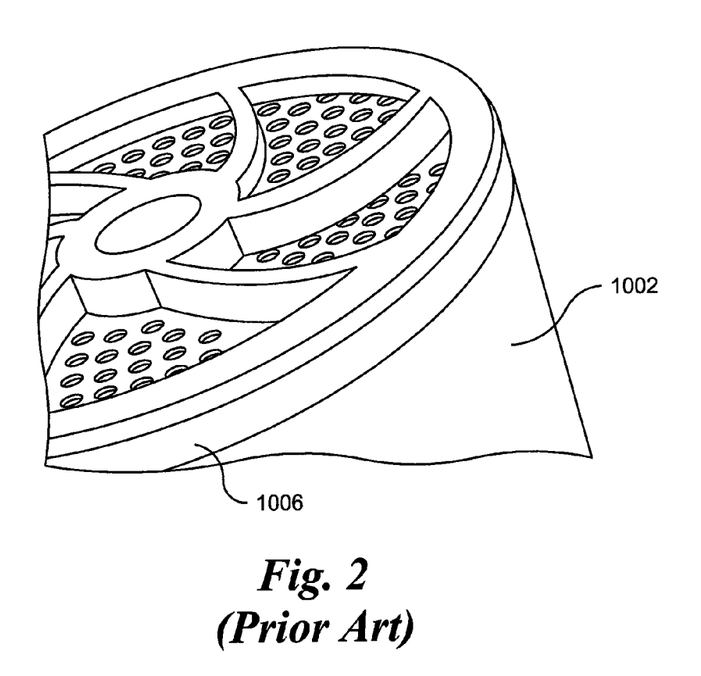
FIG. 2 is a partial perspective view of a conventional U-shaped brine seal assembled to a filter assembly.

Typical filter apparatuses 1000 (FIGS. 1 and 2) of the prior art include one or more tubular filter assemblies 1002 housed within a tubular pressure vessel 1004. Such tubular filter assemblies have replaceable filter elements, such as a spirally wound reverse osmosis or ultrafiltration filters. Typical tubular filter assemblies 1002 are manufactured in a variety of sizes, such as 4, 6, 8 and 16 inch diameters. In operation, the tubular filter assemblies are housed within the tubular pressure vessel at elevated pressures to prevent mixing of feed and brine water with clean permeate water, as shown in FIG. 1. To maintain the effectiveness of the tubular filter assemblies and keep the cost of the filter apparatus as low as possible, the tubular filter assemblies are connected together in series within a single tubular pressure vessel. The tubular filter assemblies include a brine seal 1006 at an end of each tubular filter assembly 1002.

Brine seals 1006 are needed on the tubular filter assemblies 1002 to direct feed water into the filter element of the filter apparatus 1000 and prevent feed flow from bypassing a tubular filter assembly. Such brine seals 1006 are attached to the ends of the tubular filter assembly and preferably about its anti-telescoping device (ATD) on its feed-side to prevent the bypass of feed liquid between the tubular filter assembly 1002 and the tubular pressure vessel 1004. The brine seal is typically designed to extend or expand when feed liquid flows into the brine seal to form a water-tight seal. Such brine seals are formed from flexible rubber materials to adjust for minor tolerance differences between the internal diameter of the tubular pressure vessel and the outside diameter of the brine seal/tubular filter assembly.

The configuration of conventional brine seals is problematic, since tubular filter assemblies with conventional brine seals can only be inserted and passed through a tubular pressure vessel in a single direction. Thus, should a single tubular filter assembly need to be replaced, the entire series of tubular filter assemblies within a single pressure vessel in front of the direction of travel of the problematic tubular filter assembly would need to be removed for the exchange. In addition, conventional rubber brine seals produce a significant amount of friction when dragging/pushing the filter assembly into or out of the tubular pressure vessel. Thus, when a tubular filter assembly is particularly heavy, such as with a 16" diameter filter assembly, it makes the removal of the tubular filter assembly difficult.

Conventional brine seals are also generally configured as a U-cup brine seal 1006. The U-cup brine seal 1006 has a bottom portion of the "U" pointing in the direction of feed flow. As such, the U-cup brine seal allows easy movement in the direction of flow of the feed liquid. That is, when the tubular filter assembly is moved in the feed flow direction, the U-cup brine seal naturally folds on itself. However, if the tubular filter assembly 1002 is pulled in the opposite direction, the U-cup brine seal will open up and create much more friction and resistance to movement in the direction opposite to the feed flow direction. Because of this issue, many plants load pressure vessels from the feed-side and remove the tubular filter assemblies from the brine-side of the tubular pressure vessel. This, however, results in a greater need for plant floor space to accommodate this type of action about both ends of the tubular pressure vessel.

Further, conventional rubber brine seals must also be lubricated to allow the tubular filter assembly to efficiently slide within the tubular pressure vessel. However, such lubricants can detrimentally contaminate the filter assembly's filter element.

Furthermore, the areas directly behind traditional brine seals are not exposed to turbulent flow conditions. Thus, the stagnant nature of fluid behind the brine seal allows for the formation of biofoul growth, which is detrimental to the operation of filter apparatus.

Accordingly, there is still a need for a filter assembly that can be loaded and removed from a pressure vessel about a single end, a filter assembly having a brine seal which reduces the amount of physical force necessary for multiple filter assembly installation and/or extraction, and eliminates the use of lubricants.

BRIEF SUMMARY OF THE INVENTION

In a first aspect, the present invention provides a filtration device that includes a tubular pressure vessel and a tubular filter assembly. The tubular filter assembly is housed within the tubular pressure vessel. The tubular filter assembly includes a filter element and a split ring seal. The split ring seal circumscribes the filter element and includes an annular body formed from a hard polymer. The annular body includes a first end, a second end opposite the first end and slidably engaged with the first end, and an opening extending through the annular body in a direction substantially parallel to a longitudinal axis of the annular body.

In a second aspect, the present invention provides an anti-telescoping device for a spiral wound element that includes a cylindrical body and a brine seal. The cylindrical body includes a gland circumscribing the cylindrical body. The brine seal is positioned within the gland and extends radially outwardly from the gland. The brine seal also includes an annular body having a lateral surface, a medial surface opposite the lateral surface, and an opening extending through the brine seal to allow fluid communication from the lateral surface to the medial surface.

In a third aspect, the present invention provides a filtration device that includes a tubular pressure vessel and a tubular filter assembly. The tubular pressure vessel includes an outer surface and an inner surface. The tubular filter assembly is housed within the tubular pressure vessel and includes a filter element and a brine seal. The brine seal circumscribes the filter element and includes an annular body formed from a hard polymer. The brine seal is spaced apart from the inner surface of the tubular pressure vessel.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments of the invention which are presently preferred. It should be understood, however, that the invention is not limited to the precise arrangements and instrumentalities shown. In the drawings.

DETAILED DESCRIPTION OF THE INVENTION

Figure 3:
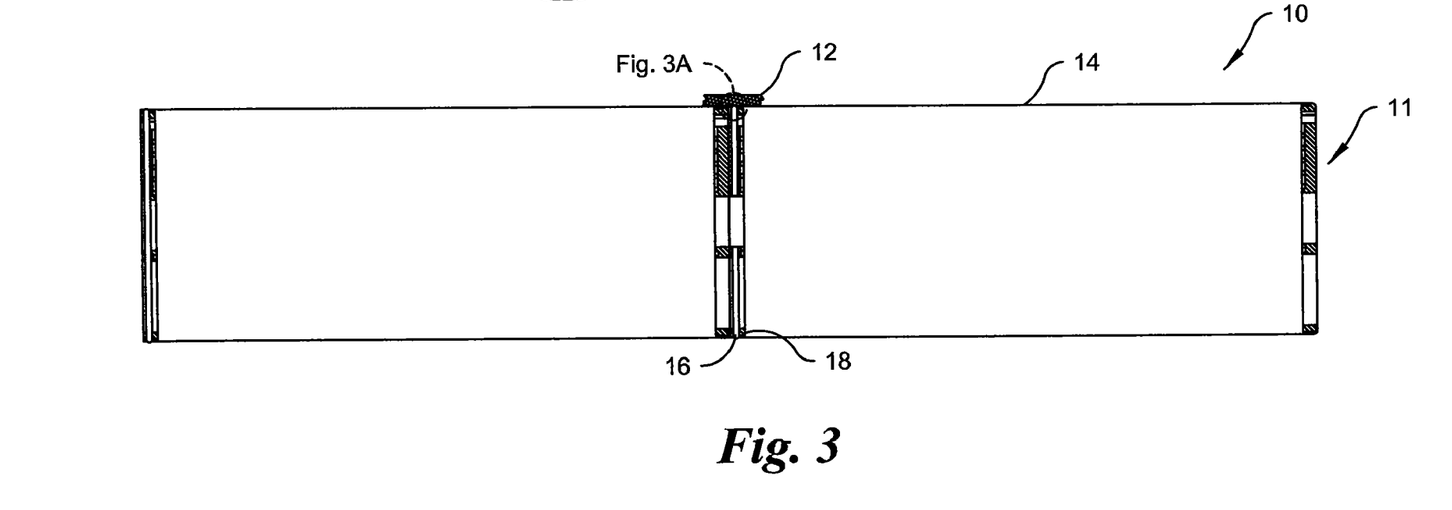
FIG. 3 is a partial, cross-sectional, side elevational view of a filter apparatus in accordance with a first aspect of the present invention.

Referring to FIG. 3, in a first aspect, the present invention provides a filtration device 10 that includes a pressure vessel 12, a filter assembly 14 and a split ring seal 16. The pressure vessel 12 is preferably a tubular pressure vessel with opposite ends forming an inlet and an outlet of the pressure vessel. The filter assembly 14 is preferably a tubular filter assembly that is housed within the tubular pressure vessel 12 and inserted into the tubular pressure vessel through its inlet end 11. Since tubular pressure vessels are known in the art, a detailed description of its structure and operation is not necessary for a complete understanding of the present invention. However, exemplary tubular pressure vessels include those manufactured e.g., by Bekaert of Vista, Calif., Pentair of Minneapolis, Minn. and Bel Composite of Beer Sheva, Israel.

The tubular filter assembly 14 includes a filter element 15 (FIG. 3A) and a split ring seal 16. The filter element 15 can be any water filter element, such as a reverse osmosis filter, an ultrafiltration filter, a nanofiltration filter, or a microfiltration filter. Such tubular filter elements are known in the art and thus a detail description of their structure and function is not necessary for a complete understanding of the present invention. However, an exemplary filter element of the filter assembly 14 is described in U.S. Patent Application Publication No. US2009/0314713, the entire disclosure of which is hereby incorporated herein by reference.

The tubular filter assembly 14 also includes an anti-telescoping device (ATD) 18 (FIGS. 3A and 4A-4D) about opposite ends of the tubular filter assembly. The ATD 18 is generally configured, as shown in FIGS. 4A-4D and attached to the filter element 15 about the end of the filter element to cap off the tubular filter element and prevent any telescoping of the tubular filter element that can potentially occur, such as with spiral wound tubular filter elements.

Figure 4A:
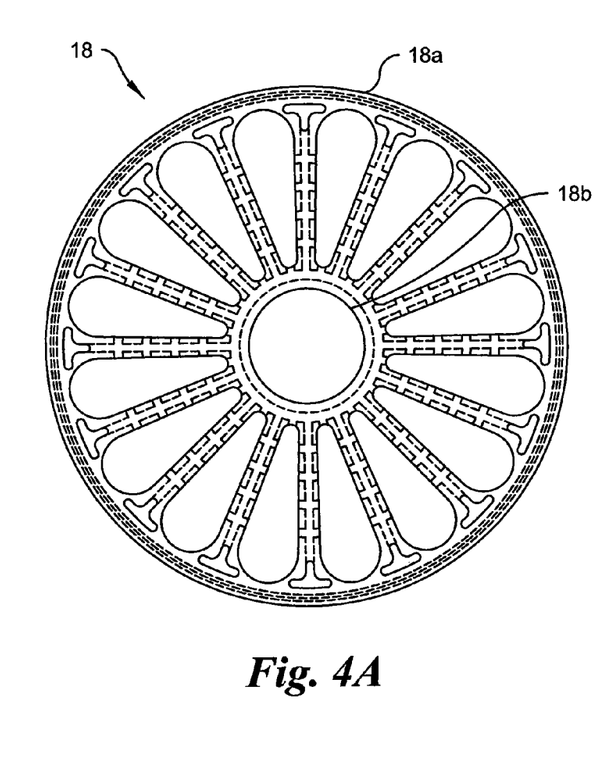
FIG. 4A is a front elevational view of one embodiment of an anti-telescoping device of the filter apparatus of FIG. 3.

The ATD 18 is preferably formed to have a disc-like shape having a cylindrical body 18a and a "spoke and wheel" configuration, as shown in FIG. 4A. A central aperture 18b extends through the ATD in a direction parallel to a central longitudinal axis A (see FIG. 4B). The central aperture 18b extends from a lateral surface 18c to a medial surface 18d.

Figure 3A:
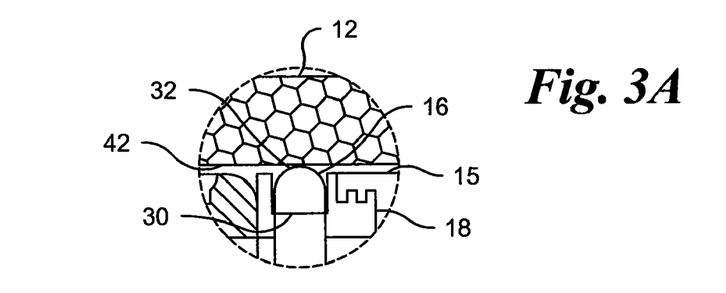
FIG. 3A is an enlarged, partial, cross-sectional, side elevational view of a detail of the filter element of the filter apparatus of FIG. 3.
Figures 4B, 4C, 4D:
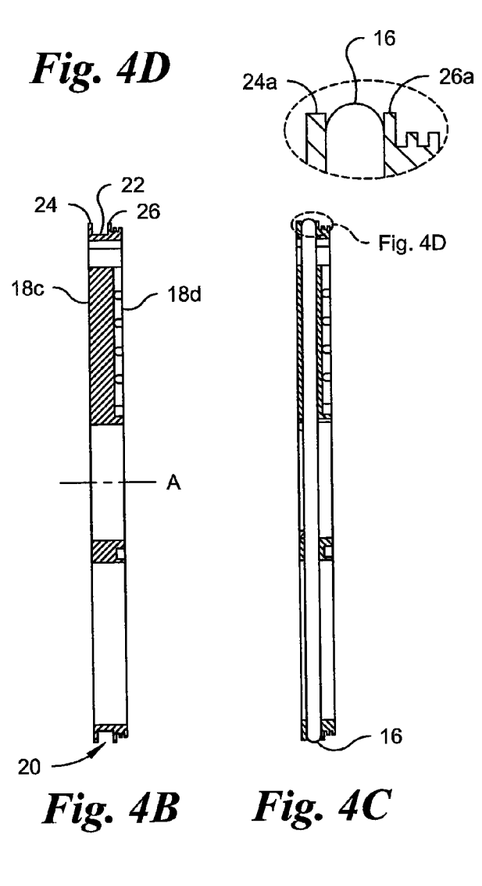
FIG. 4B is a cross-sectional, side elevational view of the anti-telescoping device of FIG. 4A.
FIG. 4C is a cross-sectional, side elevational view of the anti-telescoping device of FIG. 4A assembled with a brine seal according to one embodiment of the present invention.
FIG. 4D is an enlarged, partial, cross-sectional, side elevational view of the anti-telescoping device of FIG. 4C.

The ATD 18 also includes a circumferential gland 20 that circumscribes the cylindrical body 18a. The ATD attaches to an end of the filter assembly 14 such that the gland 20 is proximate an end of the filter assembly. The gland 20 includes a first surface 22 that is substantially parallel to the longitudinal axis A of the ATD. The first surface 22 also defines an exterior surface of the gland. The gland also includes a first wall 24 and a second wall 26 that each extends radially outwardly from the first surface 22. The first wall 24 is spaced apart from the second wall 26. In general, the gland 20 is configured to have a substantially, U-shaped cross-section when viewed along a plane extending through a longitudinal axis of the ATD or the split ring seal. The gland is generally sized and configured to house and receive the split ring seal 16, as best shown in FIGS. 3A and 4C.

The split ring seal 16 is configured, as best shown in FIGS. 5A-D. Preferably, the split ring seal 16 is formed as a unitary structure to reduce the complexity of the overall tubular filter assembly 14. The split ring seal 16 includes a substantially annular body 28. The annular body 28 has a planar inner surface 30, a convex outer surface 32, a lateral surface 33a, and a medial surface 33b. Preferably, at least one of the lateral surface 33a and the medial surface 33b of the split ring seal is spaced apart from either the first wall 24 or second wall 26 of the ATD. More preferably, both the lateral surface 33a and the medial surface 33b of the split ring seal are spaced apart from the first wall 24 and the second wall 26, respectively. Spacing the split ring seal 16 from the first and/or second wall 24, 26 advantageously allows for the flow of feed liquid along and around the gland.

The convex outer surface 32 advantageously allows for the filter assembly 14 to be inserted or removed from the tubular pressure vessel 12 in either direction, i.e., feed flow direction or opposite the feed flow direction. The split ring seal also includes a first end 34 and second end 36 that forms a split or overlap within the split ring seal. The first and second ends 34, 36 are mutually engageable with each other or can be nested in a variety of ways. Preferably, the first and second ends 34, 36 are slidably engageable with each other, such that the first end slides along and in contact with the second end. The split ring seal is movable between a first position having a first diameter and a second position having a second diameter. The split ring seal also has a thickness in a direction parallel to a longitudinal axis of the annular body of $T_s$. Preferably, the thickness $T_s$ of the split ring seal is about 0.2 to about 0.5 inches.

The split ring seal 16 is preferably formed from a hard polymer, such as a high durometer elastomer or a rigid plastic having a Shore hardness of D or higher. Preferably, the hard polymer is formed from, but not limited to polypropylene, ultrahigh molecular weight polyethylene, polyphenylene oxide, polycarbonate, polystyrene, polyvinylchloride, acrylonitrile-butadiene-styrene, styrene-acrylonitrile, polyethylene terephthalate, melamine formaldehyde and/or combinations thereof. The hard polymer advantageously provides for lower frictional forces in sliding a tubular filter assembly in or out of a tubular pressure vessel, accurate dimensioning of the split ring seal to ensure alignment with the tubular pressure vessel, and consequently removes the need for lubricants on the split ring seal.

Due to the configuration and rigid nature of the split ring seal formed from a hard polymer, the split ring seal retains its annular shape. Thus, the split ring seal can be flexed to move between the first position having a first diameter and the second position having a second diameter. That is, the split ring seal can flex for assembly onto the tubular filter assembly and collapse about the circumference of the tubular filter assembly owing to the slidably engageable first and second ends of the split ring seal. However, due to the resilient nature of the split ring seal, when assembled to the tubular filter assembly (e.g., the tubular filter assembly's gland) the split ring seal is biased and springs radially outwardly to fill an annular gap formed between the tubular filter assembly 14 and the inner wall of the tubular pressure vessel 12. Preferably, the split ring seal springs radially outwardly to fill a majority of the annular gap between the tubular filter assembly and the tubular pressure vessel and more preferably so as to directly contact an inner circumferential surface of the tubular pressure vessel. The split ring seal's flexibility advantageously allows it to collapse and reduce its overall diameter to conform to the tubular pressure vessel's inside diameter, which may vary from one vessel to another due to manufacturing tolerances.

As shown in FIGS. 3A and 4C, the split ring seal 16 is configured to extend proud of an outermost surface of the tubular filter assembly 14. For example, a typical 16" diameter tubular filter assembly can be configured to have an outside diameter of about 15.75 inches and assembled with a split ring seal having an outside diameter from about 15.83 to 15.90 inches. Thus, the split ring seal is configured to extend in the radial direction $T_R$ from the outer most surface of the filter element about 0.080 to about 0.250 inches, or about 0.5% to about 1.5% of the tubular filter assembly's outside diameter.

The outermost surface of the tubular filter assembly 14 can also be considered the ATD's first and second wall's outer most surfaces 24a, 26a (FIG. 4D). The split ring seal extends in the radial direction from the outer most surface of the ATD. Preferably, the split ring seal extends from the outermost surfaces 24a, 26a about 0.5% to about 1.5% of the ATD's overall diameter.

Figure 5A:
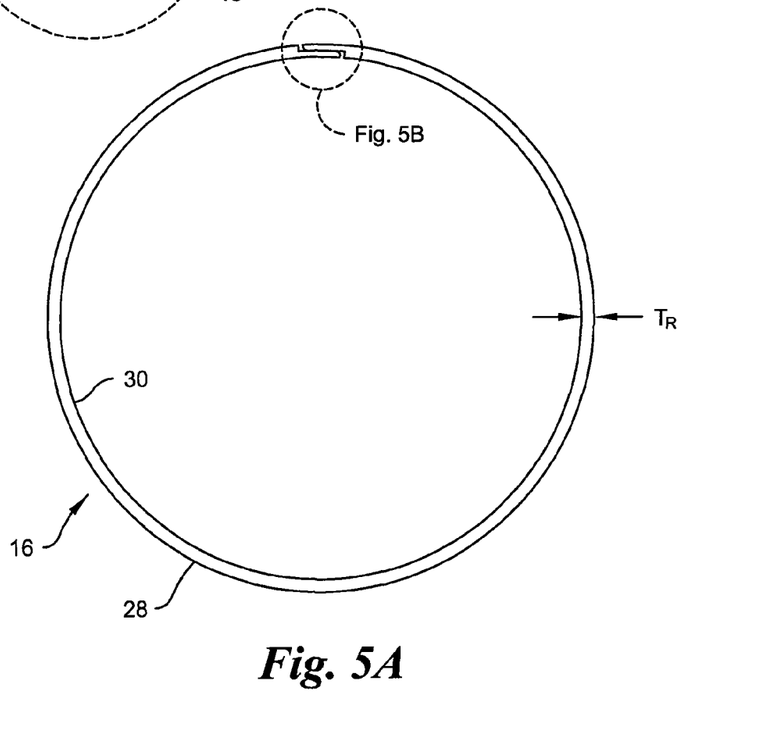
FIG. 5A is a front elevational view of a split ring seal in accordance with the first aspect of the present invention.
Figures 5B, 5C, 5D:
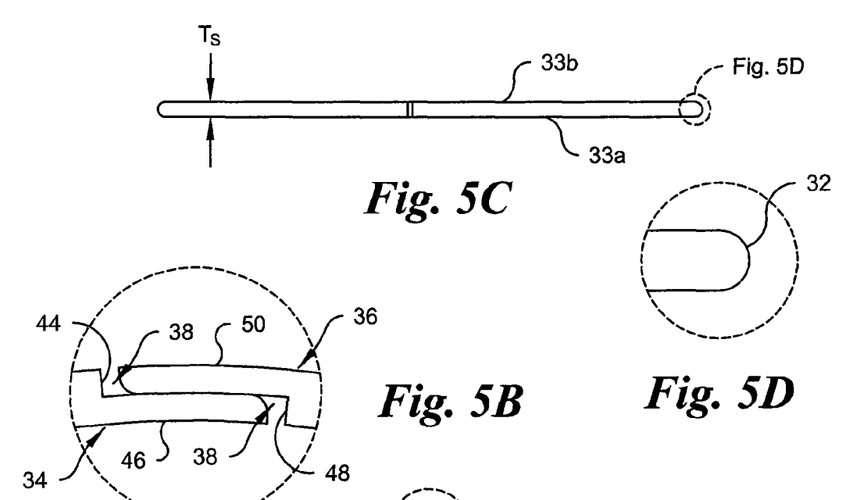
FIG. 5B is an enlarged, partial, side elevational view of the split ring seal of FIG. 5A.
FIG. 5C is a side elevational view of the split ring seal of FIG. 5A.
FIG. 5D is an enlarged, partial, side elevational view of the split ring seal of FIG. 5C.

FIGS. 3, 4C and 4D illustrate the split ring seal 16 mounted within the gland 20 of the ATD 18. When mounted within the gland, the split ring seal has its inner surface 30 in contact with the first surface 22 of the gland. Moreover, as best shown in FIG. 5B, the split ring seal has an opening 38 that extends through the annular body 28 in a direction substantially parallel to a longitudinal axis of the annular body. The opening 38 allows for a diminutive amount of liquid feed flow to bypass around the tubular filter assembly's exterior. In other words, the opening is sized to control a certain amount of liquid feed flow to continually travel through the tubular pressure vessel thereby preventing any languishing or stagnant liquid that can amass or form biological residuals. As a result, the opening inhibits biofouling growth and accumulation behind the split ring seal. Preferably, the opening is sized to allow about 0.1% to about 5.0% of the liquid feed flow rate Q passing through the tubular pressure vessel to pass through.

Referring back to FIG. 3A, the split ring seal 16 can alternatively be configured with or without an opening 38 and with its convex outer surface 32 being spaced apart from an interior surface 42 of the pressure vessel 12. Preferably, the split ring seal is spaced apart from the interior surface about 0.01 inches to about 0.03 inches. More preferably, the split ring seal is spaced apart from the interior surface sufficient to form a gap opening about 0.0% to about 1.5% of the total cross-sectional surface area taken along a plane perpendicular to a longitudinal axis of the tubular pressure vessel. Alternatively, the split ring seal is spaced apart from the interior surface of the pressure vessel to allow about 0.0% to about 5.0% of the liquid feed flow rate Q passing through the pressure vessel to pass through. Having the split ring seal slightly spaced apart from the interior surface of the pressure vessel advantageously allows for fluid feed flow through the tubular pressure vessel about the region of the split ring seal so as to inhibit stagnant liquid and consequential biofouling growth and accumulation. Moreover, the structural and resilient nature of the split ring seal allows it to spring outwardly to further reduce the annular gap formed between the tubule filter assembly and the tubular pressure vessel.

Referring back to FIG. 5B, the split ring seal 16 has a first end 34 that includes a first surface 44 and first flange 46 that extends from the first surface 44. The split ring seal's second end 36 includes a second surface 48 and a second flange 50 extending from the second surface 48. The first surface 44 is preferably configured to substantially face the second surface 48. The first flange is configured to slidingly engage the second flange to allow variations within the split ring seal's diameter and for assembly onto the ATD. However, each of the first and second flanges are preferably configured such that the first flange 46 is spaced apart from the second surface 48 and/or the second flange 50 is spaced apart from the first surface 44. As a result, the spacing between the first flange 46 and the second surface 48 or the second flange 50 and first surface 44 define the opening 38.

Figure 6:
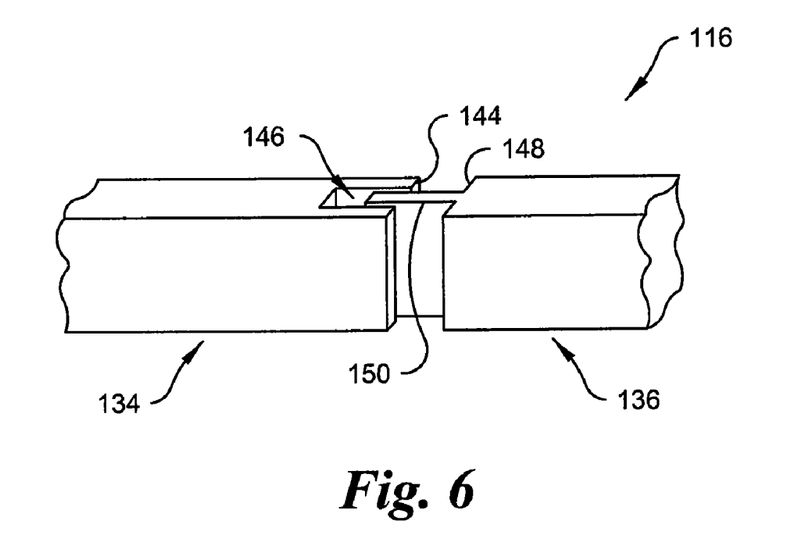
FIG. 6 is an enlarged, partial perspective view of a split ring seal in accordance with another aspect of the present invention.

FIG. 6 illustrates a split ring seal 116 in accordance with another aspect of the present invention. The split ring seal 116 includes a first end 134 and a second end 136. The first end 134 includes a first surface 144 and a groove 146 extending from the first surface 144. The second end 136 includes a second surface 148 and a flange 150 extending from the second surface 148. The groove 146 and flange 150 are configured to nest in a tongue and groove configuration. The first surface 144 substantially faces the second surface 148.

Figure 7:
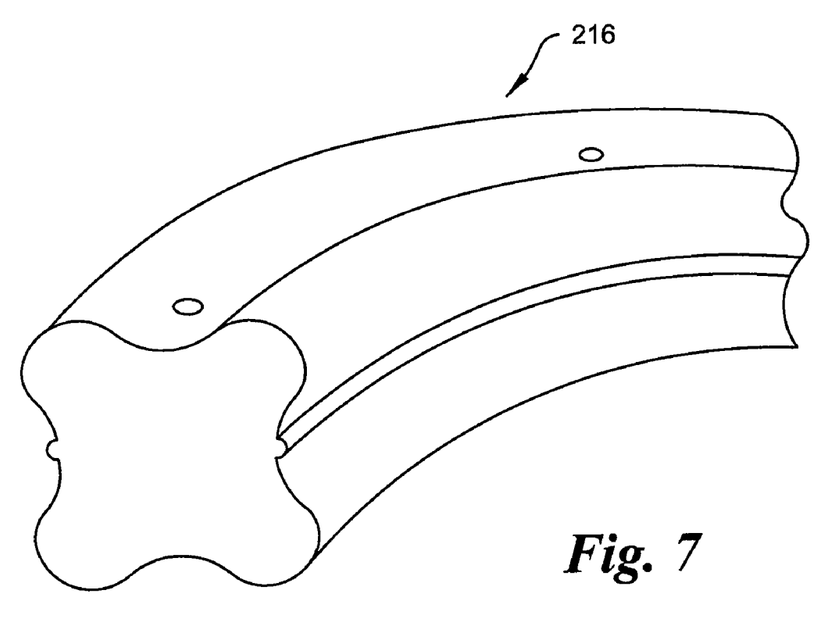
FIG. 7 is an enlarged, partial perspective view of a split ring seal in accordance with yet another aspect of the present invention.

Alternatively, the split ring seal can be configured as a quad ring 216, as shown in FIG. 7.

In the fully assembled state, as best shown in FIGS. 3 and 3A, the split ring seal 16 circumscribes the tubular filter assembly 14 and extends proud of an outer most surface of the tubular filter assembly to provide a barrier against feed flow through the tubular pressure vessel. However, due to the split ring seal's opening 38 and/or spacing from the tubular pressure vessel's interior wall surface, the split ring seal advantageously allows for a certain degree of play such that the split ring seal does not completely hinder the passage of feed flow about the exterior of the tubular filter assembly. As such, the split ring seal inhibits potential biofouling about locations proximate the split ring seal due to e.g., stagnant or non-turbulent flow of feed flow.

Figure 8A:
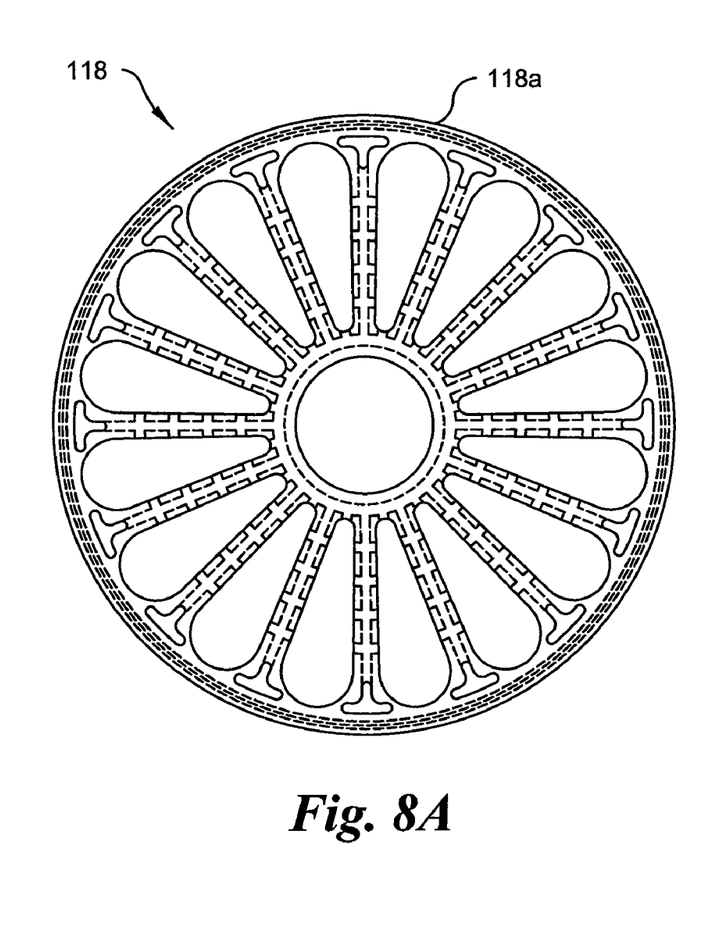
FIG. 8A is a front elevational view of another embodiment of an anti-telescoping device in accordance with another aspect of the present invention.
Figure 8B:
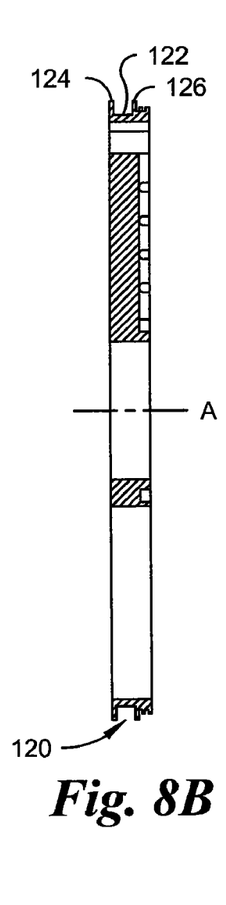
FIG. 8B is a cross-sectional, side elevational view of the anti-telescoping device of FIG. 8A.
Figure 8C:
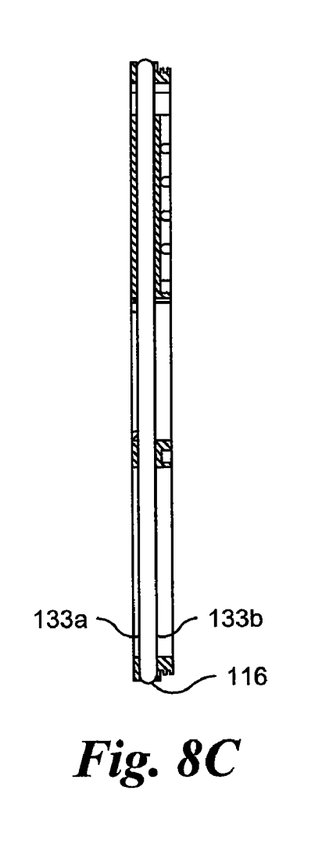
FIG. 8C is a cross-sectional, side elevational view of the anti-telescoping device of FIG. 8A assembled with a brine seal according to one embodiment of the present invention.

In accordance with yet another aspect, the present invention provides an anti-telescoping device 118 for a spiral wound filter element, as shown in FIGS. 8A-8C. The anti-telescoping device 118 includes a cylindrical body 118a and is generally configured to have a disc-like shape as similarly described above for ATD 18. The cylindrical body 118a includes a gland 120 that circumscribes the cylindrical body 118a. The gland 120 is similarly configured as gland 20 described above for ATD 18.

The anti-telescoping device 118 also includes a brine seal 116 positioned within the gland. The brine seal 116 can be configured as described above for the split ring seal 16, or be configured as an O-ring seal 116 that is molded directly into the gland so as to be integrally formed as part of the anti-telescoping device thereby greatly reducing complexity of handling in a field/use environment. The gland includes a first wall 124 and a second wall 126 that extends radially outwardly from a first transverse surface 122. The first transverse surface 122 extends parallel to a longitudinal axis of the anti-telescoping device. The brine seal 116 includes a lateral surface 133a and a medial surface 133b, and is preferably configured to have at least one of the lateral surface 133a and the medial surface 133b of the brine seal spaced apart from either the first wall 124 or the second wall 126. More preferably, both the lateral surface 133a and the medial surface 133b of the brine seal are spaced apart from the first wall 124 and the second wall 126, respectively.

The split ring seal 16 or brine seal 116 of the above embodiments can optionally be configured to include a biocidal agent to further inhibit biofouling of the filtration device. Exemplary biocidal agents applicable to the present invention can include, but are not limited to, biocides based on detergents, dyes, halogens, heavy and precious metals, phenolic compounds, quaternary ammonium compounds, and silane derivatives. Preferably, the biocidal agent is 5-chloro-2-(2,4-dichlorophenoxy)phenol (also known as Triclosan). Such biocidal agents can be compounded and/or mixed directly into the resin used for molding or forming the split ring seal 16 or brine seal 116.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A filtration device (10) comprising:
   a tubular pressure vessel (12);
   a tubular filter assembly (14) housed within the tubular pressure vessel, the tubular filter assembly having:
   a filter element (15), and
   a brine seal (16, 116, 216) assembled to an end of the tubular filter assembly and extending radially beyond an outermost surface of the filter element,
   wherein the brine seal comprises an annular body (28) having a split therein such that the annular body has a first end (34, 134) and a second end (36, 136) opposite the first end, the first and second ends being mutually engageable with each other to form a split ring seal which is movable between a first position having a first diameter and a second position having a second diameter, and
   wherein the split ring seal is formed from a polymer which is sufficiently rigid to retain its annular shape and sufficiently resilient to allow the split ring seal to flex for assembly by collapsing about a circumference of the tubular filter assembly and biased to spring radially outwardly to fill an annular gap between the tubular filter assembly and the tubular pressure vessel.

2. The filtration device of claim 1, wherein the split ring seal is configured to extend radially outwardly from the tubular filter assembly (14) and spaced apart from an interior surface (42) of the tubular pressure vessel.

3. The filtration device of claim 2, wherein the split ring seal is spaced apart from the interior surface (42) of the tubular pressure vessel (12) to form an annular gap sufficient to allow up to about 5.0% of a total fluid flow volume through the filtration device to pass through.

4. The filtration device of claim 1, wherein the annular body (28) further comprises a planar inner surface (30) and a convex outer surface (32).

5. The filtration device of claim 1, wherein the first end (34) includes a first surface (44) substantially facing a second surface (48) of the second end (36), wherein a first flange (46) extends from the first surface and a second flange (50) extends from the second surface, and wherein the first flange slidably engages the second flange.

6. The filtration device of claim 5, wherein one of the first and second flanges (46, 50) is spaced apart from one of the first and second surfaces (44, 48) defining an opening (38) extending through the annular body (28) in a direction parallel to a longitudinal axis of the annular body.

7. The filtration device of claim 1, wherein the first end (134) includes a first surface (144) substantially facing a second surface (148) of the second end (136), the first surface having a groove (146) and the second surface having a tongue (150), wherein the tongue extending from the first surface is received within the groove.

8. The filtration device of claim 7, wherein the first surface (144) is spaced apart from the second surface (148) defining an opening (38) extending through the annular body in a direction parallel to a longitudinal axis of the annular body.

9. The filtration device of claim 1, wherein the tubular filter assembly (14) further comprises a circumferential gland (20) proximate an end of the tubular filter assembly for receiving the split ring seal.

10. The filtration device of claim 9, wherein the circumferential gland (20) comprises a U-shaped cross-section taken along a plane extending through a longitudinal axis of the annular body (28), the U-shaped cross-section having:
    a first wall (24) extending radially outwardly; and
    a second wall (26) spaced apart from the first wall and extending radially outwardly, and
    wherein the split ring seal is spaced apart from at least one of the first wall and the second wall.

11. The filtration device of claim 1, wherein the polymer is selected from the group consisting of polypropylene, ultra-high molecular weight polyethylene, polyphenylene oxide, polycarbonate, polystyrene, polyvinylchloride, acrylonitrile-butadiene-styrene, styrene-acrylonitrile, polyethylene terephthalate, melamine formaldehyde and combinations thereof.

12. The filtration device of claim 1, wherein the split ring seal comprises a biocidal agent.

13. The filtration device of claim 1, wherein the tubular filter assembly (14) further comprises a gland (20), and wherein the split ring seal is mounted within the gland and is biased radially outwardly to extend from the gland.

14. The filtration device of claim 1, wherein the polymer has a Shore hardness of D or higher.

* * * * *